United States Patent [19] [11] 4,336,302
Ihlein [45] Jun. 22, 1982

[54] INSULATING TAPE FOR FABRICATING AN INSULATING SLEEVE FOR ELECTRIC CONDUCTORS IMPREGNATED WITH A THERMO-SETTING EPOXY RESIN/ACID ANHYDRIDE MIXTURE

[75] Inventor: Walter Ihlein, Berlin, Fed. Rep. of Germany

[73] Assignee: Siemens Aktiengesellschaft, Munich, Fed. Rep. of Germany

[21] Appl. No.: 227,384

[22] Filed: Feb. 11, 1981

[30] Foreign Application Priority Data

Jan. 29, 1980 [DE] Fed. Rep. of Germany ....... 3003477

[51] Int. Cl.³ .......................... B32B 5/16; B32B 27/38
[52] U.S. Cl. ..................................... 428/324; 428/241; 428/363; 428/411; 428/413; 428/417; 428/418; 428/454
[58] Field of Search ............... 428/324, 906, 417, 418, 428/413, 429, 454, 411, 363, 241, 420; 427/301

[56] References Cited

U.S. PATENT DOCUMENTS

| 3,647,611 | 3/1972 | Mertens | 428/324 |
| 3,841,959 | 10/1974 | Mertens | 428/363 |
| 3,868,613 | 2/1973 | Rogers | 428/413 |
| 4,026,862 | 5/1977 | Smith | 428/263 |
| 4,128,598 | 12/1978 | Makino | 428/413 |
| 4,168,331 | 9/1979 | Davis | 428/413 |
| 4,265,966 | 5/1981 | Schuh | 428/363 |

FOREIGN PATENT DOCUMENTS 2142571 6/1972 Fed. Rep. of Germany ...... 428/324

Primary Examiner—Ellis P. Robinson
Attorney, Agent, or Firm—Kenyon & Kenyon

[57] ABSTRACT

An insulating tape containing mica serves for manufacturing an insulating sleeve of electric conductors, impregnated with a thermo-setting epoxy resin mixture. The binder for cementing the mica is a self-hardening mixture with an accelerator for the impregnating resin mixture. In order that all kinds of epoxy resins can be used as impregnating resins, quaternary onium salts are added as accelerators to the epoxy resin used as the binder.

10 Claims, No Drawings

INSULATING TAPE FOR FABRICATING AN INSULATING SLEEVE FOR ELECTRIC CONDUCTORS IMPREGNATED WITH A THERMO-SETTING EPOXY RESIN/ACID ANHYDRIDE MIXTURE

BACKGROUND OF THE INVENTION

The present invention relates to an insulating tape for fabricating an insulating sleeve for electric conductors and intended to be impregnated with a thermo-setting epoxy resin/acid anhydride hardener mixture, particularly for the winding bars or coils of electric machines. The insulating tape consists of one or more layers of a planar, breakdown-proof inorganic material, such as mica flakes or thin mica films, which are applied to a flexible substrate and which are cemented to the substrate and to each other (and optionally, to a final cover layer) by means of a binder which contains an accelerator for promoting the hardening reaction of the resin mixture to be impregnated, wherein the binder-accelerator mixture forms a system which is self-hardening at the setting temperature of the impregnating resin.

Such an insulating tape, as is known from U.S. Pat. No. 3,647,611, makes it possible to carry out the subsequent impregnation economically with a slow-reacting impregnating resin mixture which is not subject to increases in viscosity even at the high impregnating temperatures, thereby ensuring thorough impregnation of the insulating sleeve. This is necessary because only a small percentage of the epoxy resin/acid anhydride mixture used as the impregnating resin penetrates into the insulating sleeve, while the rest must be re-used for other impregnations. The insulating tape, therefore, contains an accelerator which promotes the setting reaction of the impregnating resin mixture, so that the impregnating resin penetrated into the insulating sleeve sets in an economically justifiable time.

In order that the insulating tapes can be stored for a long time before the impregnation, the binder-accelerator mixture in the known insulating tape is chosen so that at room temperature practically no setting of the mixture occurs. Moreover, the binder-accelerator mixture forms a self-hardening system which self-hardens, however, only at the setting temperatures of the impregnating resin, which is substantially above room temperature. In this manner, it is prevented that binder which has penetrated between large-area layers of the breakdown-proof inorganic material, and thus cannot be resorbed completely by the impregnating resin, remains unhardened in the insulation.

In the known insulating tapes, cycloaliphatic epoxy resins are utilized as the binder, in which the epoxy groups are produced by the addition of oxygen to ring-located double bonds and which exhibit no reaction, or only a greatly delayed reaction, with amine hardeners or accelerators, as is generally known. With the addition of the epoxy resin/acid anhydride impregnating resin, however, these accelerators develop their full catalytic activity.

Cycloaliphatic epoxy resins, however, can be produced only with difficulty and have the further disadvantage that, according to recent investigations, these compounds are physiologically not without risk. Hence, it would be desirable to employ other epoxy resins as the binder. However, the properties of cycloaliphatic epoxy resins which render them so desirable for use in the known method, i.e., the ability to form mixtures with amine hardeners or accelerators, which mixtures do not react until in the presence of the epoxy resin/acid anhydride impregnating resin, are not exhibited by, e.g., glycidyl ether, glycidyl ester or N-glycidyl-epoxy resins.

SUMMARY OF THE INVENTION

It is, therefore, an object of the present invention to provide a binder-accelerator system for insulating tapes of the type described, which is effective for all epoxy resins and not only for cycloaliphatic epoxy resins.

This and other objects are achieved by the addition of quaternary onium salts as accelerators to the epoxy resins used as the binder in the insulating tape of the type described at the outset. Using quaternary organic onium salts as the accelerator in the binder-accelerator mixture of an insulating tape intended for impregnation with epoxy resin/acid anhydride mixtures has the surprising advantage that the quaternary onium salts cause practically no ionic polymerization in epoxy compounds at room temperature. An insulating tape constructed in accordance with the present invention can, therefore, be stored at room temperature for more than three months without changing its properties. On the other hand, the quaternary onium salts have the effect that gelling or setting of an epoxy resin/acid anhydride mixture is promoted even at temperatures of about 60° C. and is accelerated substantially, so that it is possible to harden the portion of the impregnating resin which has penetrated into the insulating sleeve in an economically short time.

The binder-accelerator system provided in this manner remains fully soluble in the impregnating resin with certainty under the conditions of drying and preheating of the insulating sleeve wound of the insulating tapes before the insulation is impregnated, without exhibiting the decrease in reactivity as compared to the impregnating resin which penetrates into the insulating sleeve during the impregnating process.

The use of quaternary onium salts as latent catalysts in epoxy resin/acid anhydride hardener mixtures is known from U.S. Pat. No. 4,026,862. There, single-component casting resin mixtures are described which, however, contain, in contrast to the present invention, the epoxy resin as well as the acid anhydride hardener and accelerator and to which in addition, stabilizers, for example, in the form of carboxylic acid, are added for increasing the storage time.

In the insulating tape developed according to the present invention, the following epoxy resins may be used as a binder:

Epoxy compounds such as bisphenol A-diglycidyl ether, bisphenol F-diglycidyl ether, resorcinol-diglycidyl ether, epoxidized phenol or cresol novolaks as well as N-glycidyl compounds such as heterocyclic epoxy compounds with a hydantoin base. Further epoxies are cited in "Handbook of Epoxy Resins" by H. Lee and K. Neville, McGraw-Hill Book Co., 1967. Particularly advantageous is the use of higher functional epoxidized phenol or cresol novolaks and hydantoin epoxy resins which are excellent binders for the insulation tapes due to their high viscosity and adhesion.

It is advantageous if the binder contains quaternary onium salts having the following general structure formula:

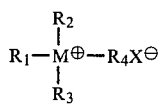

where

M is an atom of the fifth main group in the periodic system of the elements, particularly N and P;

$R_1$, $R_2$, $R_3$, $R_4$ are the same or different aliphatic (these may also contain further quaternary atoms), aromatic, heterocyclic, or arylaliphatic radicals and in which 3-radicals can belong jointly or also in pairs to heterocyclic rings, and $X^-$ is an anion, such as $Cl^-$, $Br^-$, $I^-$, $F^-$, $NO_3^-$, $ClO_4^-$ an organic acid radical such as acetate, or a complex anion such as $BF_4^-$, $PF_6^-$, and the like, because they are particularly effective. In the binder-accelerator mixture can also be contained polymeric quaternary onium salts such as are described in German Pat. No. 26 57 282.

Quaternary onium salts suitable for the binder-accelerator mixture are:

Benzyl-dimethyl-hexadecylammonium chloride, benzyl-dimethyl-tetradecylammonium chloride, benzyl-triethylammonium chloride, benzyl-triethylammonium bromide, tetrabutylammonium chloride, tetrabutylammonium bromide, tetrabutylammonium nitrate, and the like;

Hexadecylpyridinium chloride, hexadecyl pyridinium bromide, ethyl-pyridinium bromide, 1,1' ethylene bis (pyridinium bromide), and the like;

1-methyl-3 dodecylimidazolium chloride, 1-methyl-3 dodecylimidazolium bromide, 1, 2-dimethyl-3-benzyl imidazolium chloride, 1,2-dimethyl-3-benzylimidazolium bromide, and the like;

Tetraphenyl-phosphonium chloride, tetraphenyl-phosphonium bromide, tetrabutyl-phosphonium chloride, and the like;

Tetraphenylarsonium chloride, triphenyl methyl arsonium bromide, and the like, where the reactivity of the individual compounds decreases with increasing anion size.

In the fabrication of the insulating tape, the content of binder is chosen not too high in order that the impregnating resin can penetrate well into the voids in the tape during impregnation. The weight percent of the compounds used as the binder for cementing the insulating tape is therefore approximately between about 3 and 10%, referred to the total weight of the insulating tape. With such a binder content, it is advisable to set the amount of accelerator approximately in the order of about 0.05 to 3% by weight, referred to the total weight of the insulating tape. The amount of accelerator added to the insulating tape during its manufacture depends upon the amount of inorganic material, for example, mica, which the tape contains per substrate and the amount of the binder used for cementing the insulating tape.

A further improvement of the insulators built-up from insulating tapes according to the invention, which have great stiffness, becomes possible by the provision that the binder-accelerator mixture contains additives which act as hardeners and become effective only at the setting temperature of the thermo-setting epoxy resin/acid anhydride mixture. This further increases the dimensional thermal stability of the self-hardening binder. These additives, however, do not adversely affect the storability of the insulating tape. In addition, this binder-accelerator mixture with additives remains fully soluble in the impregnating resin under the conditions of drying and preheating before the insulation is impregnated.

Particularly well suited are admixtures acting as hardeners which are insoluble in the binder up to nearly 80° C. and have a sufficiently high melting point relative to the setting temperature of the resin such as, for example, 2-phenol-4,5dihydroxymethyl imidazole. Such admixtures exhibit their activity only at the setting temperatures, while the gelling of the impregnating resin penetrating into the insulating sleeve is initiated in the temperature range of about 60° C. by the quaternary onium compounds which are likewise present in the binder.

As admixtures are further suited complex compounds or adducts which are decomposed only at the setting temperatures into hardening-effective components. These are compounds such as are described in German Pat. No. 28 11 764, or salts of trimellitic acid with imidazoles such as 1-cyanoethyl-2-methyl imidazole trimellitate.

It is further preferable to use as admixtures encapsulated hardener systems or hardener systems adsorbed on substances with a large active surface, which are released and become effective only at the setting temperature or through exchange with other compounds. Thus, tertiary amines adsorbed, for example, in molecular sieves can be used.

The amount of these hardeners admixed to the binder depends on their specific effectiveness and generally is within the range of between about 0.05 and 10% by weight, referred to the weight of the binder.

DETAILED DESCRIPTION OF THE INVENTION

In the following, the behaviour of insulating tapes built-up in accordance with the present invention is explained in further detail with references to Tables 1 to 3.

Table 1 contains a listing of the storage stability of mixtures, stored in thin layers in an open vessel, of three characteristic epoxy resin types, A, B and C with different quaternary compounds 1 to 5 serving as accelerators. The accelerators are as follows:

1. Benzyldimethyl tetradecylammonium chloride
2. Tetrabutyl ammonium bromide
3. Hexadecylpyridinium bromide
4. 1-methyl-3-benzylimidazolium chloride
5. Tetraphenylphosphonium bromide

TABLE 1

| Epoxy Resin | Accelerator | Parts by wgt. of accel. per 100 pts by wgt. Epoxy | Storage Stability of The Mixtures (days) at Room Temp | 70° C. | Gelling Time at 130° C. in hours |
|---|---|---|---|---|---|
| A | 1 | 15 | not determined | >60 | |
|   | 2 | 75 | at 90° C., broken off after 18 days | sample still has low viscosity | 192 |
| B | 1 | 15 | >100 | 7 | 63 |
|   | 2 | 7.5 | >100 | 40 | 90 |
|   | 3 | 10 | >100 | 28 | 70 |
|   | 4 | 10 | >100 | 12 | 24 |
|   | 5 | 10 | >100 | 52 | 50 |

TABLE 1-continued

| Epoxy Resin | Accelerator | Parts by wgt. of accel. per 100 pts by wgt. Epoxy | Storage Stability of The Mixtures (days) at Room Temp | 70° C. | Gelling Time at 130° C. in hours |
|---|---|---|---|---|---|
| C | 4 | 10 | >30 test still running | 30 | 100 |

The compounds were dissolved while heating (to 70° C.) or by means of $MeCl_2$ as the dissolution agent, in the respective epoxy resins A, B, and C where A is a glycidyl ether of bisphenol A with an epoxy equivalent of 174±2 and a viscosity of 5,000±500 mPas at 25° C., B is a semisolid epoxidized phenol novolak with an epoxy equivalent of 178±5 and a viscosity of 1600±300 mPas at 80° C., and C is a semisolid trifunctional hydantoin epoxy resin with an epoxy equivalent of 166 and a viscosity of about 6000 mPas at 80° C.

From Table 1 the low effectiveness of these compounds with respect to ionic polymerization in the temperature range of about 70° to 80° C. can clearly be seen.

TABLE 2

| Binder Accelerator Mixture | Pts by wgt. binder Acclerator Mixture per 100 pts by wgt. Epoxy Resin-Acid Anhydride | Gelling Time (Min) of The Epoxy Resin-Acid Anhydride Binder-Accelerator Mixture | |
|---|---|---|---|
| | | 70° C. | 90° C. |
| A 1 | 23 | 150 | 35 |
| B 1 | 23 | 120 | 32 |
| B 2 | 21.5 | 73 | 22 |
| B 3 | 22 | 135 | 30 |
| B 4 | 22 | 23 | 95 |
| B 5 | 22 | 70 | 16 |
| C 4 | 22 | 100 | 20 |

Table 2 shows the excellent acceleration effect of these types of compounds as a binder-accelerator mixture on an epoxy resin/acid anhydride mixture of a glycidyl ether of bisphenol A (epoxy resin A) and a methylhexahydrophthalic acid anhydride.

The examples shown in the tables show the effects of the quaternary onium compounds as an accelerator component in a binder-accelerator mixture of an insulating tape constructed in accordance with the present invention. The insulating tapes made with the binder-accelerator combination described here can be stored at room temperature for more than three months. Because the binder-accelerator mixture is self-hardening, it is ensured by the particular choice of the binder-accelerator mixture that with the hardening of the insulating sleeve after impregnation with an epoxy resin/acid anhydride mixture, all locations are hardened, i.e., including locations at which the binder was not resorbed by the impregnating resin. Thus, insulation with very good electrical properties and high dimensional heat stability is obtained.

TABLE 3

| Epoxy Resin | Accelerator | Pts by wgt Hardener per 100 pts Epoxy Resin | Hardener | Storage Stability of the Mixture (days) at Room Temp | 70° C. | Gelling Time At 130° C. (hours) |
|---|---|---|---|---|---|---|
| B | Tetrabutyl-ammonium bromide 7.5 pts by wgt per 100 pts by wgt. Epoxy Resin | | 1 | 5 | >100 | 7 | 16 |
| | | | 2 | 5 | >100 | 6 | 12 |
| | | | 3 | 5 | >100 | 5 | 10 |
| D | | | 1 | 5 | >100 | 4 | 13 |
| | | | 2 | 5 | 97 | 3 | 10 |
| | | | 3 | 5 | 83 | 3 | 10 |

Table 3 contains data on the storage stability of binder mixtures with a quaternary onium compound (tetrabutylammonium bromide) as accelerator and some specific hardeners as admixture for this binder-accelerator mixture. Here, too, low reactivity of the admixtures on the binder of the insulating tape is seen up to the temperature range of 70° C. A comparison with Table 1 shows overall a somewhat higher reactivity for the temperature range around 70° C., but, here too, the excellent stability of the mixtures is provided at room temperature. As binders were used, for example, epoxy resin B and epoxy resin D (tetraglycidyl-p,p'-methylene aniline with an epoxy equivalent of 130±10 and a viscosity of about 1800 mPas at 80° C.). As admixtures serve the hardeners 1 to 3, where 1 is 2,4-diamino-6(2'-methylimidazolyl-(1')ethyl-s-triazine 2 is 2-phenyl-4,5-dihydroxymethyl imidazole 3 is 1-cyano-ethyl-2-phenyl imidazole-trimellitate Through the increase by about 30° to 40° C. of the vitrification point of the hardened binder achievable by means of the admixtures, the stiffness of the insulating sleeve is increased further and its mechanical strength at high temperatures is increased.

What is claimed is:

1. An insulating tape for manufacturing an insulating sleeve for electric conductors and intended to be impregnated with a thermo-setting epoxy resin/acid anhydride hardener mixture, said tape comprising at least one layer of inorganic, breakdown-proof planar material, selected from the group consisting of mica flakes and thin mica films, applied to a flexible substrate, said layer or layers being cemented to the substrate and to each other with an epoxy resin binder containing as an accelerator for promoting the hardening reaction of the resin used for impregnation, a quaternary onium salt, said mixture of binder and accelerator forming a system which is self-hardening at the setting temperature of the thermo-setting impregnating resin, said epoxy resin binder and said accelerator being present, respectively, in amounts from about 3 to about 10% and from about 0.05 to about 3%, percents by weight of the total weight of the insulating tape.

2. The insulating tape according to claim 1 wherein said accelerator is a quaternary onium salt having the following structural formula:

$$R_1 - \overset{\overset{\displaystyle R_2}{|}}{\underset{\underset{\displaystyle R_3}{|}}{M^\oplus}} - R_4 X^\ominus$$

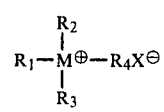

where:

M is an atom of the fifth main group of the periodic system of the elements;

$R_1$, $R_2$, $R_3$ and $R_4$ are the same or different aliphatic, aromatic, heterocyclic or arylaliphatic radicals and in which 3-radicals may belong jointly or also in pairs to heterocyclic rings, and X is an anion.

3. The insulating tape according to claim 2 wherein M is selected from the group consisting of nitrogen and phosphorous and X is an anion selected from the group consisting of $Cl^-$, $Br^-$, $I^-$, $F^-$, $NO_3^-$, $ClO_4^-$, an organic acid radical, and complex anions.

4. The insulating tape according to claim 1 wherein said accelerator is a polymeric quaternary onium salt.

5. The insulating tape according to claim 1 wherein said mixture of binder and accelerator further contains an admixture acting as a hardener which becomes effective only at the setting temperature of the thermo-setting epoxy resin/acid anhydride hardener mixture, the amount of said admixture being from about 0.05 to about 10% by weight, referred to the weight of the binder.

6. The insulating tape according to claim 5, wherein said admixture is insoluble in the binder to approximately 80° C. and has a sufficiently high melting point relative to the setting temperature of the resin.

7. The insulating tape according to claim 6 wherein said admixture is 2-phenyl-4,5-dihydroxymethyl imidazole.

8. The insulating tape according to claim 5 wherein said admixture is a complex compound or adduct which is decomposed only at the setting temperature into a hardening-effective component.

9. The insulating tape according to claim 5 wherein said admixture is an encapsulated hardener system which is released and becomes effective only at the setting temperature or through exchange with other compounds.

10. The insulating tape according to claim 5 wherein said admixture is a hardener system adsorbed on a substance having a large surface area which is released and becomes effective only at the setting temperature or through exchange with other compounds.

* * * * *